United States Patent [19]
Watanabe

[11] Patent Number: 5,235,897
[45] Date of Patent: Aug. 17, 1993

[54] BRAKE BOOSTER

[75] Inventor: Makoto Watanabe, Saitama, Japan

[73] Assignee: Jidosha Kiki Co., Ltd., Tokyo, Japan

[21] Appl. No.: 827,321

[22] Filed: Jan. 29, 1992

[30] Foreign Application Priority Data

Feb. 14, 1991 [JP] Japan .................................. 3-042719
Mar. 20, 1991 [JP] Japan .................................. 3-081466

[51] Int. Cl.⁵ .............................................. F15B 9/10
[52] U.S. Cl. ................................... 91/376 R; 91/390; 92/34
[58] Field of Search ................ 91/6, 369.2, 369.3, 91/376 R, 390; 92/34, 48, 49

[56]            References Cited
U.S. PATENT DOCUMENTS

| 3,155,012 | 11/1964 | Ayers | 92/49 |
| 4,499,812 | 2/1985 | Pressaco et al. | 91/369.3 |
| 4,640,097 | 2/1987 | Kobayashi | 91/369.2 |
| 4,718,326 | 1/1988 | Sugiura et al. | 91/369.2 |

FOREIGN PATENT DOCUMENTS 60-25840  2/1985  Japan .
1-127446  5/1989  Japan .

Primary Examiner—Edward K. Look
Assistant Examiner—E. Daniel Loper
Attorney, Agent, or Firm—Flynn, Thiel, Boutell & Tanis

[57]            ABSTRACT

An improvement of a brake booster is provided which is also provided with the function to serve as an automatic braking unit. A front bead of bellows disposed in a constant pressure chamber is supported by and urged against the wall surface of a front shell by a support of a support member. When the atmosphere is introduced into the internal space within the bellows to cause the brake booster to serve as an automatic braking unit, even though the front bead of the bellows is axially pulled as the bellows expands, a leakage around a seal where the front bead is connected is prevented because the front bead is urged against the wall surface of the front shell by the support member.

14 Claims, 8 Drawing Sheets

BRAKE BOOSTER

FIELD OF THE INVENTION

The invention relates to a brake booster, and more particularly, to an improvement of a brake booster which is capable of functioning as an automatic braking unit.

Description of the Prior Art

A brake booster capable of functioning as an automatic braking unit is known in the art as comprising a valve body slidably disposed in a shell, a power piston connected to the valve body, a constant and a variable pressure chamber formed across the power piston, a constant pressure passage formed in the valve body to allow a communication between the constant pressure chamber and a valve mechanism which switches a fluid circuit and which allows a communication between the constant and the variable pressure chamber through the valve mechanism and a variable pressure passage, and bellows disposed within the constant pressure chamber and having its rear end connected to the constant pressure passage and its front end connected to the shell, thus allowing a negative pressure or the atmosphere to be selectively delivered into the internal surface within the bellows (see, for example, Japanese Laid-Open Patent Application No. 127,446/1989).

In this brake booster, the atmosphere may be delivered into the bellows to introduce the atmosphere into the variable pressure chamber when required, thereby allowing the brake booster to be actuated without the depression of a brake pedal.

Other forms of a brake booster capable of functioning as an automatic braking unit are also disclosed in Japanese Laid-Open Patent Application No. 25,840/1985.

In the brake booster initially cited, the connection of the front end of the bellows to the shell takes place as follows: specifically, an annular groove is formed in the inner wall of the shell, in which the front end of the bellows is fitted by its own resilience, thereby maintaining a hermetic seal.

Accordingly, when the atmosphere is introduced into the bellows to operate the brake booster as an automatic braking unit, the entire bellows will be expanded radially outward. This causes the front end of the bellows which is fitted in the annular groove in the shell to be pulled both axially and radially outward. Consequently, the brake booster disclosed in Japanese Laid-Open Patent Application No. 127 446/1989 suffers from the likelihood of a leakage from the seal between the annular groove in the shell and the front end of the bellows when the atmosphere is introduced into the bellows.

SUMMARY OF THE INVENTION

In view of the foregoing, the invention relates to a brake booster comprising a valve body slidably disposed in a shell, a power piston connected to the valve body, a constant and a variable pressure chamber defined across the power piston, a constant pressure passage formed in the valve body to allow a communication between the constant pressure chamber and a valve mechanism which switches a fluid circuit and to allow a communication between the constant and the variable pressure chamber through the valve mechanism and a variable pressure passage, and bellows disposed within the constant pressure chamber and having a rear end connected to the constant pressure passage and a front end connected to the shell, thereby enabling a negative pressure or the atmosphere to be selectively delivered into the internal space within the bellows. In accordance with the invention, a support member is provided within the constant pressure chamber to support the front end of the bellows and to urge it against the shell.

With this arrangement, a leakage from a seal between the front end of the bellows and the shell when the atmosphere is introduced into the internal space within the bellows can be prevented in a favorable manner. Specifically, as the bellows expands and its front end is pulled both axially and radially outward the support member, which holds the front end of the bellows abutting against the shell, prevents the likelihood of a leakage from such seal.

Above and other objects, features and advantages of the invention will become apparent from the following description of several embodiments thereof with reference to the attached drawings.

DETAILED DESCRIPTION OF EMBODIMENTS

Figure 1:
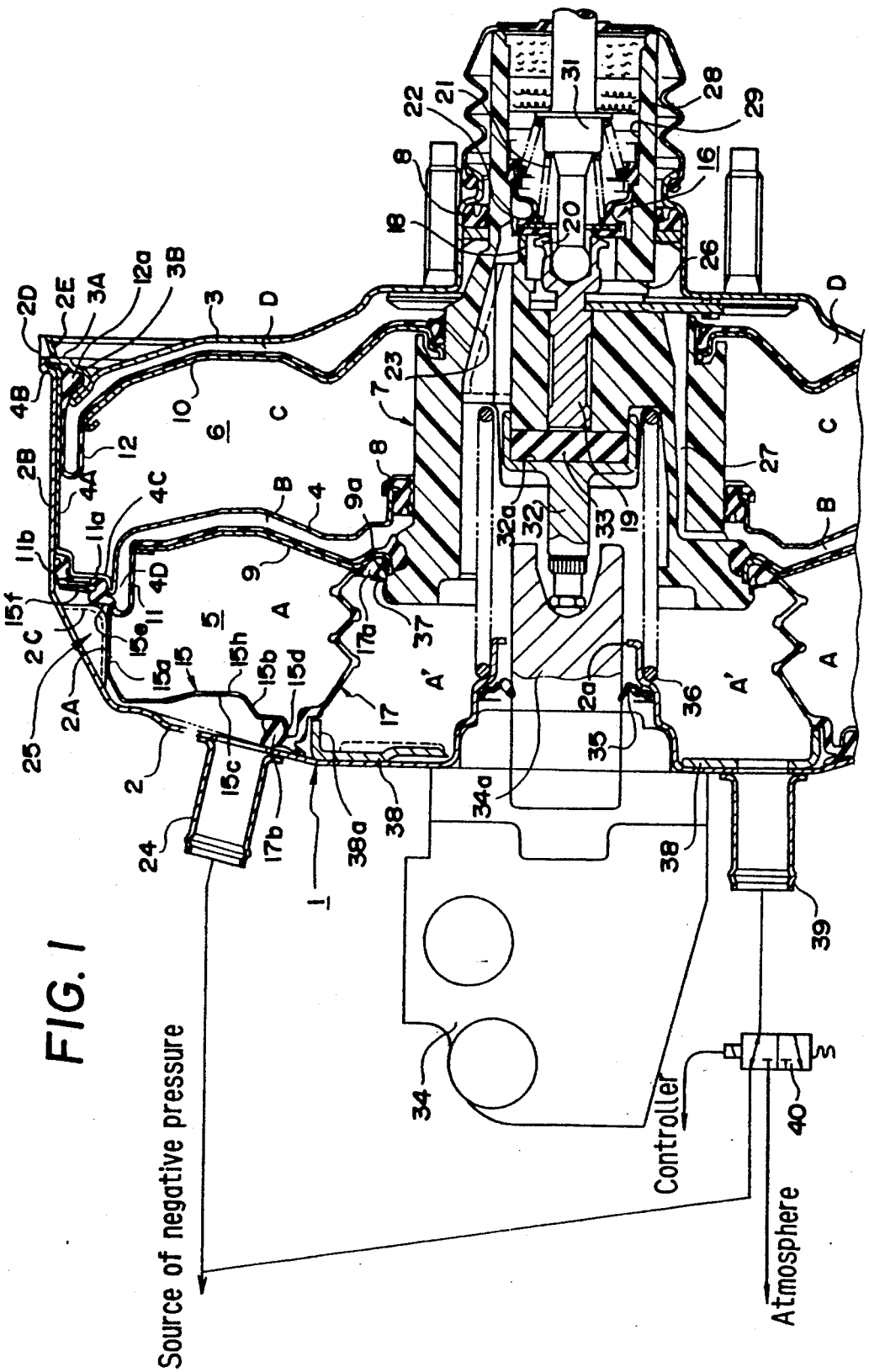
FIG. 1 is a longitudinal section of one embodiment of the invention with a schematic illustration of associated circuit.

Referring to the drawings, several embodiments of the invention will now be described. Initially referring to FIG. 1, there is shown of a brake booster of tandem type including a shell 1 which is defined by a substantially cup-shaped front shell 2 and a substantially dish-shaped rear shell 3 which closes the opening of the front shell 2. The cup-shaped front shell 2 includes a forwardly located cylindrical section 2A of a reduced diameter and a rearwardly located cylindrical section 2B of a greater diameter, with a radially extending annular wall 2C formed to extend there-between. Toward the opening of the cylindrical section 2B, the shell 2 is formed with a cylindrical detent 2D of a greater diameter. A substantially cup-shaped center plate 4 is fitted inside the front shell 2, with a front chamber defined between the end walls of the center plate 4 and the front shell 2. The center plate 4 includes a cylindrical section 4A which is tightly fitted inside the cylindrical section 2B of the front shell 2 and a positioning section 4B which is located at the right end of the cylindrical section 4A and which extends radially outward in the form of a flange. As the cylindrical section 4A of the center plate 4 is fitted inside the cylindrical section 2B of the front shell 2, the positioning section 4B is held in abutment against a stepped end face between the cylindrical section 2B and the cylindrical detent 2D, thus axially positioning the center plate 4 which is fitted inside the front shell 2.

Around its outer periphery, the rear shell 3 is formed with a flange 3A which extends radially outward. The flange 3A is fitted against the cylindrical detent 2D of the front shell 2 and is simultaneously held in abutment against the positioning section 4B of the center plate 4 from the rear side. Under this condition, the flange 3A of the rear shell 3 is engaged by a plurality of pawls 2E which are formed in the cylindrical detent 2D, thereby integrally connecting the front shell 2, the center plate 4 and the rear shell 3 together. A rear chamber 6 is defined between the wall of the rear shell 3 and the end wall of the center plate 4 which are connected together in this manner.

In their central or axial portions, the center plate 4 and the rear shell 8 are formed with through-openings, through which a valve body 7 in the form of a stepped cylinder slidably extends, with seal members 8 being provided to maintain a hermetic seal between the through-openings and the valve body 7.

A front power piston 9 and a rear power piston 10 are disposed in the front chamber S and the rear chamber 6, respectively, and the inner periphery of the respective power pistons 9 and 10 are connected to the valve body 7. A front diaphragm 11 and a rear diaphragm 12 are applied to the back surface of the respective power pistons 9 and 10, and the inner periphery of the respective diaphragms 11 and 12 is also connected to the valve body 7.

On the other hand, the front diaphragm 11 has a bead 11a extending around its outer periphery, which is axially held between a wall 4C formed around the outer peripheral portion located at the left end of the cylindrical section 4A of the center plate 4 in opposing relationship with the annular wall 2C of the front shell 2, and an outer peripheral portion of a support member 15 which is held in abutment against the annular wall 2C of the front shell 2 as will be further described later, thus maintaining a hermetic seal in this region. The front diaphragm 11 divides the front chamber S into a forwardly located constant pressure chamber A and a rearwardly located variable pressure chamber B.

The rear diaphragm 12 also has a bead 12a extending around its outer periphery, which is received in an annular groove 3B which is formed around the outer periphery of the rear shell S so as to extend radially outward and which is also radially held between the outer peripheral surface of the annular groove 3B and the inner peripheral surface of the cylindrical section 4A of the center plate 4, thus maintaining a hermetic seal in this region while dividing the rear chamber 0 into a forwardly located constant pressure chamber C and a rearwardly located variable pressure chamber D.

A valve mechanism 16, which is constructed in a manner known in the art, is disposed within the valve body 7, and operates to switch a fluid circuit between the pair of constant pressure chambers A, C and the pair of variable pressure chambers B, D when bellows 17, to be described later, is not provided. Specifically, the valve mechanism 18 comprises an annular, first valve seat 18 formed on the valve body 7, and an annular second valve seat 20 located radially inward of the valve seat 18 and formed on the right end of a valve plunger 10 which is slidably disposed in the valve body 7, and a valve element 22 adapted to be seated upon either valve seat 18 or 20 from the right a viewed in FIG. 1 under the resilience of a spring 21.

A space located radially outward of an annular seat defined by the contact between the first valve seat 18 and the valve element 22 communicates with the constant pressure chamber A through an axially extending, first constant pressure passage 20 formed in the valve body 7 when the bellows 17 is not provided. The constant pressure chamber A is adapted to have a negative pressure introduced thereinto from a source of negative pressure through a tubing 24 which is connected to the front shell 2. The constant pressure chamber A is maintained in communication with the constant pressure chamber C through a second constant pressure passage 25, to be described later, which is disposed outward of the bead 11a extending around the outer periphery of the front diaphragm 11. Accordingly, whenever a negative pressure is introduced into the constant pressure chamber A, the negative pressure is also introduced into the constant pressure chamber C through the second constant pressure passage 25.

On the other hand, a space located radially inward of the annular seat defined by the contact between the first valve seat 18 and the valve element 22 and located radially outward of an annular seat defined by the contact between the second valve seat 20 and the valve element 22, or a space located intermediate the inner and the outer annular seats communicates with the variable pressure chamber D through a radially extending variable pressure passage 26 formed in the valve body 7, and thence to the variable pressure chamber B through another axially extending variable pressure passage 27 also formed in the valve body 7.

Finally, a space located radially inward of the inner annular seat defined by the contact between the second valve seat 20 and the valve element 22 communicates with the atmosphere through a pressure passage 29 formed in the valve body 7 and a filter 28 disposed therein.

The right end of the valve plunger 19 which is slidably disposed within the valve body 7 is connected to an input shaft 31 which is mechanically coupled to a brake pedal, not shown, while its left end is disposed in opposing relationship with the right end face of a reaction disc 33 received in a recess 32a which is formed in one end of a push rod 32. The left end of the push rod 32 is mechanically coupled to a piston 34a which is formed in one 34 which extends through an opening 2a formed in an axial portion of the front shell 2. A seal member 35 maintains a hermetic seal between the opening 2a and the piston 34a.

A return spring 36 is disposed between the valve body 7 and the axial portion of the front shell 2, whereby the valve body 7 is normally maintained in its inoperative position shown where the valve element 22 is seated upon the second valve seat 20 while a slight clearance is maintained between the first valve seat 18 and the valve element 22.

In the present embodiment, bellows 17 formed of rubber extends between the end wall of the front shell 2 and the periphery of the front end of the valve body 7, with a support member 15 maintaining the front end of the bellows 17 in abutment against the end wall of the front shell 2.

Specifically, the rear end of the bellows 17 is formed as a rear bead 17a having a substantial thickness, which is disposed in abutment against an annular recess 9a formed around the inner periphery of the front power piston 9, and a retainer 37 is fitted around the outer periphery of the valve body 7 from the front side so as to bear against the rear bead 17a to maintain it retained within the annular recess 9a. In this manner, a hermetic seal is maintained between the rear bead 17a of the bellows 17 and the annular recess 9a.

The front end of the bellows 17 is formed as a front bead 17b having a substantial thickness and which is substantially square in cross section. The outer diameter of the front bead 17b is chosen to be greater than the outer diameter of the rear bead 17a, and is slightly greater than the outer diameter of a reinforcing plate 38 which is applied along the wall of the front shell 2 to form part thereof. The front bead 17b is urged by a support member 15, to be described later, which engages the rear side thereof to urge it against the end wall of the front shell 2 at a location radially outward of a tubular portion 38a which defines the outer periphery of the reinforcing plate 38, thus maintaining a hermetic seal in this region. It is to be noted that a radially inward portion of the front bead 17b which is disposed in abutment against the wall of the front shell 2 is in the form of a lip so as to maintain a tight adherence with the wall of the front shell 2, thus contributing to maintaining a hermetic seal between the both members.

In this manner, the bellows 17 disposed within the constant pressure chamber A defines an internal space A' which communicates with the source of negative pressure mentioned above, through through-openings formed in the reinforcing plate 38 and the front shell 2 and through a second tubing 39 mounted on the wall of the front shell 2.

A solenoid valve 40 is disposed in a conduit between the second tubing 39 and the source of negative pressure for selectively communicating the tubing 39 with the atmosphere or the source of negative pressure. The valve 40 is turned on and off by a controller, not shown, and in its inoperative condition shown in FIG. 1, the tubing 39 communicates with the source of negative pressure. Accordingly, a negative pressure is introduced into the internal space A' of the bellows 17 through the tubing 39.

By contrast, when the solenoid valve 40 is operated by the controller as required, the atmosphere is introduced into the internal space A' of the bellows 17 through the tubing 39. Upon being introduced into the internal space A' of the bellows 17, the atmosphere is also introduced into the both variable pressure chambers B and D through the first pressure passage 23, the valve mechanism 16 and the both variable pressure passages 26 and 27. Accordingly, in the present embodiment, by operating the solenoid valve 40 under the inoperative condition of the brake booster of tandem type shown in FIG. 1, the brake booster can be operated without depression of a brake pedal, not shown, which is mechanically coupled to the input shaft 31.

The support member 15 which supports the front bead 17b of the bellows 17 will be described in more detail. Specifically, the support member 15 comprises a steel material which is substantially shaped as a cup, and includes a cylindrical portion 15a which is fitted inside the cylindrical section 2A of the front shell 2 and a wall 15b which extends radially inward and forwardly of the cylindrical portion 15a. At a plurality of locations which are circumferentially spaced apart, the wall 15b is formed with through-openings 15c substantially centrally as viewed along its length to permit a communication across the wall 15b in order to allow the negative pressure to be introduced into the entire constant pressure chamber A without obstruction. The inner peripheral edge of the wall 15b extends forwardly to provide a tubular support 15d, which is effective to support the front bead 17b of the bellows 17 from the rear side together with the adjacent portion of the wall 15b.

Figure 2:
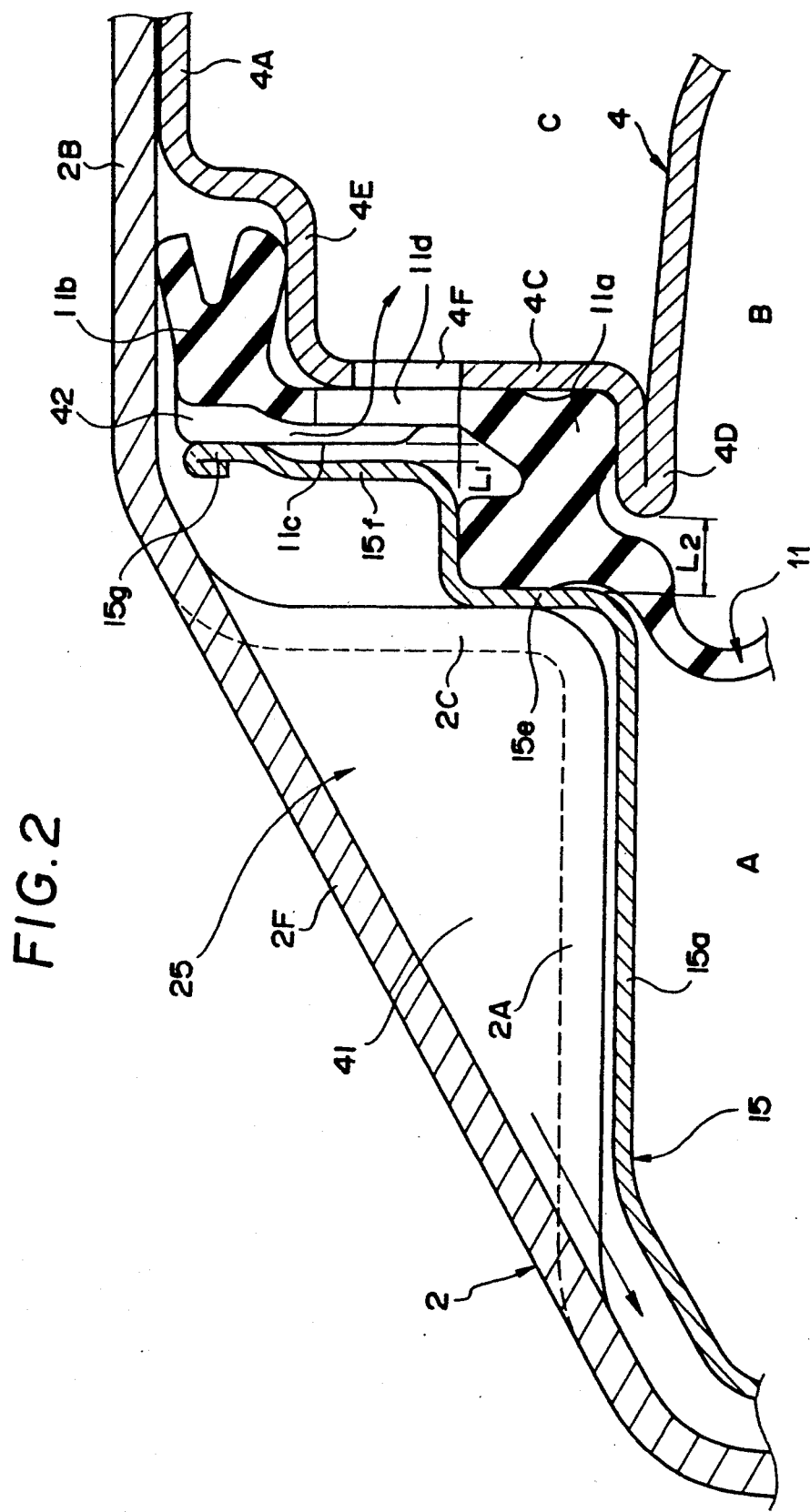
FIG. 2 is an enlarged view of an essential part shown in FIG. 1.

As shown to an enlarged scale in FIG. 2, the rear end of the cylindrical portion 15a of the support member 15 is folded to extend radially outward in two steps, providing a positioning portion 15e for its radial part which is located nearer the cylindrical portion 15a and a stop 15f for its radial part which is located remote from the cylindrical portion 15a. Over its full circumference, the outer peripheral edge of the stop 15f is offset slightly axially rearward of the stop 15f to provide a locking portion 15g.

The locking portion 15g, representing the outer peripheral edge of the support member 15 is folded back in the forward direction and turned upon itself to increase its mechanical strength. This avoids any risk that the hand of a worker may be injured during the handling of the support member 15 because an exposure of a cut end around the outer periphery is eliminated. As shown in FIG. 1, in the present embodiment, the wall 15b is centrally formed with a plurality of ribs 15h which bulge rearwardly as a radial array, thereby increasing the strength of the wall 15b.

During the assembly of the brake booster of tandem type, the front bead 17b of the bellows 17 is initially supported from the rear side by the support 15d of the support member 15, and then the support member 15 is loosely fitted inside the cylindrical section 2A of the front shell 2. The bead 11a extending around the outer periphery of the front diaphragm 11 is then brought into abutment against the positioning portion 15e of the support member 15 from the rear side until the positioning portion 15e bears against the annular wall 2C of the front shell 2, thus positioning the support member 15 relative to the front shell 2 in the axial direction. When so positioned, the lip formed around the inner periphery of the front bead 17b of the bellows 17 which is then supported by the support 15d of the support member 15 abuts against the wall surface of the front shell 2, thus maintaining a hermetic seal in this region. Since the front bead 17b is retained in place by the support 15d and the adjacent wall 15b of the support member 15, it cannot be displaced radially inward. At the same time, a small clearance is formed between the tip of the locking portion 15g, which represents the outer periphery of the support member 15, and the cylindrical section 2B of the front shell 2.

As shown in FIG. 2, in the present embodiment, a length of the support member 15 which ranges from the positioning portion 15e to the locking portion 15g cooperates with the center plate 4 which is disposed in opposing relationship thereto so as to be effective to hold the bead 11a extending around the outer periphery of the front diaphragm 11 as well as a seal 11b which continues from the bead 11a in place.

Specifically, the bead 11a extending around the outer periphery of the front diaphragm 11 is extended radially outward from its rear, outer periphery, and the seal 11b is formed at the extremity of such extension. The front side of the bead 11a extending around the outer periphery of the front diaphragm 11 is held in place by the positioning portion 15e and its adjacent cylindrical portion of the support member 15 while the rear side of the bead 11a is held in place by the wall 4C of the center plate 4 which is disposed in opposing relationship with the support member 15 and by a fold-back 4D which is formed at its inner end. At the same time, the bead 11a is axially held sandwiched between the positioning member 15e of the support member 15 and the opposing wall 4C of the center plate 4, thus maintaining a hermetic seal between the positioning portion 15e and the wall 4C.

A portion intermediate the bead 11a and the seal 11b has its wall thickness reduced and is disposed in overlapping relationship with the opposite wall 4C of the center plate 4. In addition, in a region from its midpoint along its length to the seal 11b, the front surface of the intermediate portion is formed with a plurality of rectilinear ribs 11c which are spaced apart at an equal interval circumferentially and which project forwardly. The seal 11b around the outer periphery of the front diaphragm 11 is radially held between the inner surface of the cylindrical section 2B of the front shell 2 and the outer surface of the section 4E of a reduced diameter of the center plate 4, which is located between the wall 4C and the cylindrical section 4A. In this manner, the seal 11b is effective to maintain a hermetic seal between the cylindrical section 2A of the front shell 2 and the section 4E of the center plate 4. In the regions where the seal 11b tightly bears against the inner surfaces of the cylindrical section 2A and the section 4E, the seal 11b is formed into lips in order to provide a more reliable hermetic seal between the associated sections 2A and 4E.

The ribs 11c are disposed in abutment against the locking portion 15g of the support member 15, thereby preventing the seal 11b from being disengaged from between the cylindrical section 2A of the front shell 2 and the reduced diameter portion 4E of the center plate 4.

Upon completion of the assembly of the brake booster of tandem type as shown in FIG. 2, a small clearance L1 is left between the stop 15f of the support member 15 and the ribs 11c of the front diaphragm 11. In the present embodiment, the magnitude of the clearance L1 is chosen to be slightly less than a spacing L2 which represents the spacing between the positioning portion 15e of the support member 15 and the extremity of the fold-back 4D of the center plate 4, from which the wall thickness of the front diaphragm 11 located therebetween is subtracted. In this manner, in the event that the entire support member 15 is displaced in the rear direction, the stop 15f of the support member 15 bears against the ribs 11c of the front diaphragm 11, thus limiting the axial displacement of the support member 15. This prevents the diaphragm 11 from being held or seized between the positioning portion 15e of the support member 15 and the fold-back 4D of the center plate 4.

Referring to FIG. 2, the second constant pressure passage 25 which provides a communication between the both constant pressure chambers A and C will now be described. The passage 25 is formed externally of the bead 11a extending around the outer periphery of the front diaphragm 11 and the cylindrical portion 15a of the support member 15. Specifically, it comprises a forwardly located, first passage 41 and a rearwardly located, second passage 42.

The first passage 41 is defined by a plurality of bulges 2F, which ar formed by causing parts of the cylindrical section 2A and the annular wall 2C of the front shell 2 to project radially outward, and a portion of the support member 15 which is disposed opposite to the bulges 2F in a region from the cylindrical portion 15a to the locking portion 15g. The axially front end of the first passage 41 communicates with the constant pressure chamber A of the front chamber 5 while the axially rear end of the first passage 41 communicates with the second passage 42 through a gap between the locking portion 15g of the support member 15 and the cylindrical section 2A of the front shell 2.

The second passage 42 is defined by a space left between the adjacent ribs 11c of the front diaphragm 11, a plurality of elongate slots 11d formed in the front diaphragm 11 in communication with the space, and a plurality of through-openings 4F formed in the opposing wall 4C of the center plate 4 at a location which is radially aligned with the elongate slots 11d.

Figure 3:
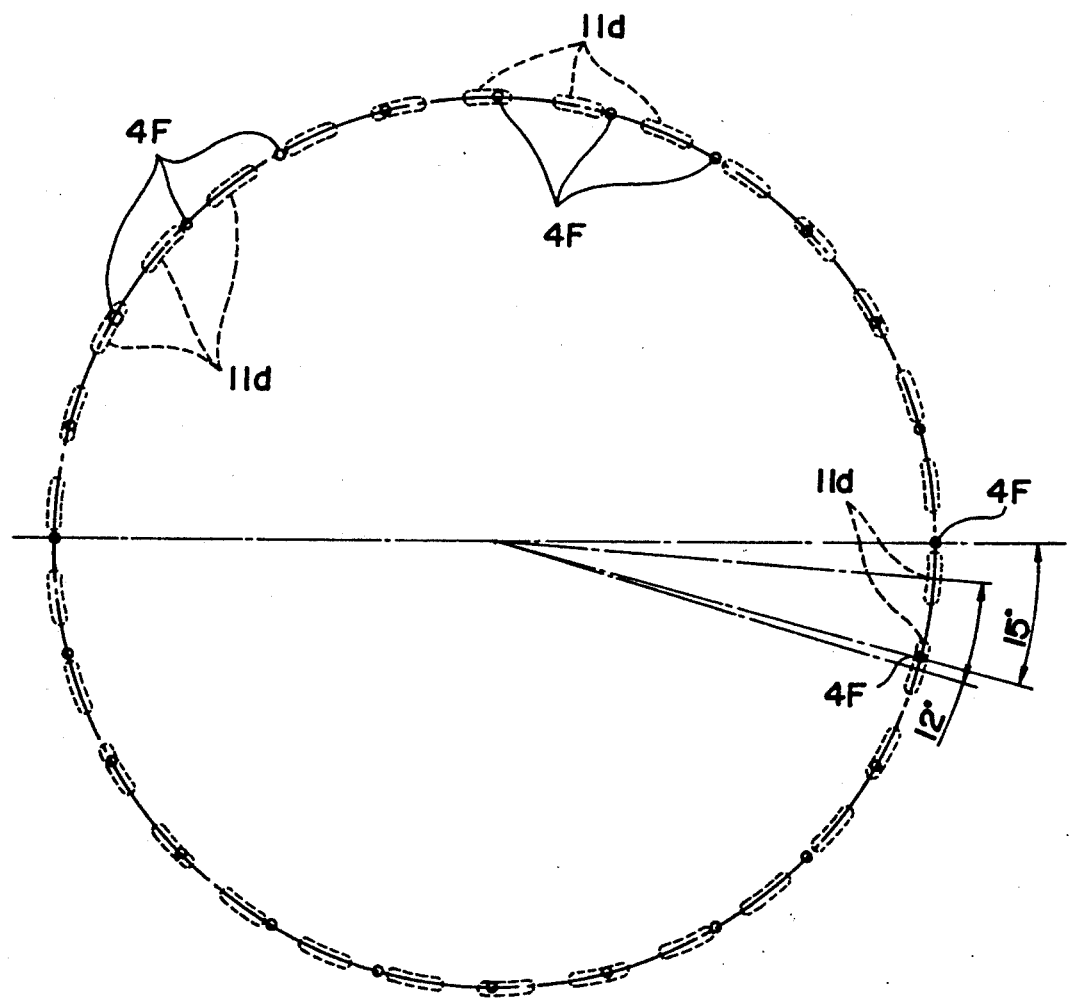
FIG. 3 is a diagram illustrating the layout of through-openings in a front diaphragm and a center plate.

FIG. 3 shows the layout of the elongate slots 11d in the front diaphragm 11 and the through-openings 4F in the center plate 4. The elongate slots 11d are formed at thirty locations around the circumference of the front diaphragm 11, and thus are spaced apart by 12°, while the through-openings 4F are formed at twenty-four locations around the circumference of the center plate 4, and thus are spaced apart by 15°. Accordingly, in the assembled condition of the brake booster, the through-openings 4F in the center plate 4 overlap the elongate slots 11d in the front diaphragm 11 at twelve locations, and these aligned slots 11d and openings 4F provide a communication between the oppositely located spaces. However, it is to be noted that the positional relationship between the slots 11d and the openings 4F are not limited to the angular interval mentioned above, but they may be formed at other mutually different pitches as long as the overlapping relationship is secured.

In this manner, in the present embodiment, the both constant pressure chambers A and C directly communicate with each other through the second constant pressure passage 25, and whenever a negative pressure is introduced into the constant pressure chamber A of the front chamber 5, the negative pressure is also introduced into the constant pressure chamber C of the rear chamber 6.

OPERATION

In the brake booster of tandem type constructed in the manner mentioned above, the solenoid valve 40 is normally not operated, as shown in FIG. 1, and therefore, a negative pressure is introduced into the internal space A' within the bellows 17 through the second tubing 39. The negative pressure is also introduced into the constant pressure chamber A through the other tubing 24, and hence also into all chambers A, B, C and D. When a brake pedal, not shown, is depressed under this inoperative condition, the input shaft 31 is driven forward or to the left, whereby the valve mechanism 16 switches the fluid circuit, thus introducing the atmosphere into the both variable pressure chambers B and D. This enables an output from the push rod 32 to be derived at a given servo ratio, in the same manner as in a conventional brake booster of tandem type.

In distinction to the normal braking operation mentioned above, when it is desired to cause the brake booster to function as an automatic braking unit, the controller which is mentioned previously may be used to operate the solenoid valve 40 under the inoperative condition shown in FIG. 1 in which the input shaft 31 is not driven forward. This causes the atmosphere rather than the negative pressure to be introduced into the internal space A' within the bellows 17. The atmosphere introduced into the internal space A' within the bellows 17 is also introduced into the both variable pressure chambers B and D through the first pressure passage 23 and the variable pressure passages 26 and 27 which communicate with the first passage 23. Accordingly, a pressure differential is developed between the both constant pressure chambers A, C and the both variable pressure chambers B, D, whereby a given output can be derived from the push rod even though the brake pedal has not been depressed.

When the atmosphere is introduced into the internal space A' within the bellows 17 in the manner mentioned above, the atmospheric pressure causes an expansion of the entire bellows 17. Accordingly, the front bead 17b tends to be pulled both radially and axially. However, the bead cannot move radially because it is held by the support 15d of the support member 15. However, because the bead 11a extending around the outer periphery of the front diaphragm 11 is compressed in the axial direction, the support member 15 which supports the front bead 15b tends to move axially rearward. Accordingly, after moving away from the annular wall 2C of the front shell 2, the positioning portion 15e of the support member 15 has its movement stopped as a result of the abutment of the stop 15f of the support member 15 against the ribs 11c of the front diaphragm 11. In the present embodiment, when the movement of the support member 15 is stopped, the front diaphragm 11 cannot be tightly held or seized between the annular wall 2C of the front shell 2 and the fold-back 4D of the center plate 4, and thus any resulting damage can be prevented in a favorable manner.

The front bead 17b of the bellows 17 as well as associated lips are maintained in tight adherence to the wall surface of the front shell even though an axial movement of the support member 15 occurs, and accordingly a leakage of the atmosphere which is introduced into the internal space A' within the bellows 17 into the constant pressure chamber A is prevented.

In the present embodiment, the seal 11b is formed integrally with the bead 11a extending around the outer periphery of the front diaphragm 11, and this facilitates the handling of the front diaphragm 11 during the assembly. By contrast, in the prior art practice, the bead 11 and the seal 11b are separate from each other, and the function of the seal 11b has been served by an O-ring of a large diameter. In such a conventional arrangement, in which the bead 11a is separate from the seal 11b, a twisting of the O-ring which should serve as a seal 11b is likely to occur during the assembly operation, which degraded the quality of the assembling operation.

By contrast in the present embodiment, the integral nature of the bead 11a and the seal 11b prevents such twisting of the seal 11b and thus improves the assembly operation.

SECOND EMBODIMENT

Figure 4:
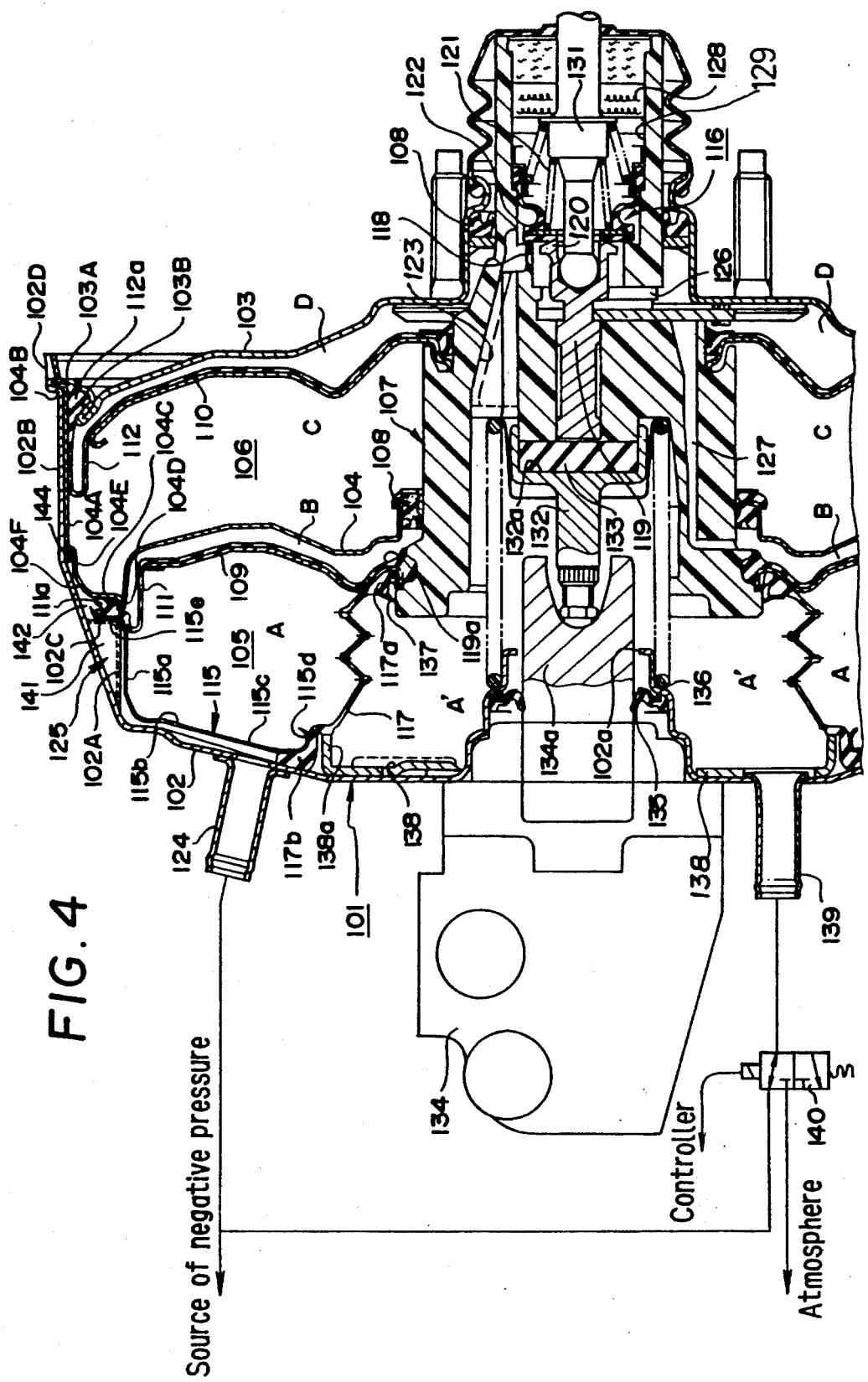
FIG. 4 is a longitudinal section of another embodiment of the invention.

Referring to FIG. 4, a second embodiment of the invention will be described, in which a front bead 117b of bellows 117 is substantially triangular in section. The front bead 117b is urged by a support 115d of a support member 115 against the wall surface of the front shell 102 from the rear side.

The support member 115 in the second embodiment has its wall 115b disposed at an angle in conformity to the inclination of the wall surface of the shell 102, thus increasing the strength of the wall 115b. Accordingly, the provision of the ribs 15h of the wall 15b shown in the first embodiments is omitted from the support member 115.

The support member 115 has a support 115d which has its free end folded back rearwardly into a U-configuration. The U-shaped support 115d and its adjacent wall 115b act to support the front bead 117b of the bellows 117, by urging it against the wall surface of the front shell 102. Adjacent to the front bead 117b which is thus urged against the wall surface of the front shell 102 and inwardly therefrom, there is provided a reinforcing plate 138 having a cylindrical portion 138a around its outer periphery. If the front bead 117b should be displaced radially inward, it cannot be disengaged as a result of its abutment against the cylindrical portion 138a of the reinforcing plate 138.

Members corresponding to the stop 15f and the locking portion 15g of the support member 15 shown in the first embodiment are omitted from the outer periphery of the support member 115, which is therefore only provided with the positioning portion 115e and a tubular portion located toward the outer periphery.

On the other hand, a front diaphragm 111 has its portion omitted which is located radially outward of the bead 11a extending around the outer periphery in the first embodiment. A bead 111a extending around the outer periphery of the front diaphragm 111 is held in place by the positioning portion 115e and its outer portion of the support member 115 and is also held in place between a fold-back 104D and its adjacent wall 104C of a center plate 104. In addition, it is axially held between the positioning portion 115e of the support member 115 and the wall 104C of the center plate 104.

As a consequence of constructing the front diaphragm 111 in the manner mentioned above, in the second embodiment, a second passage 142 of a second constant pressure passage 125 is defined by a cylindrical section 102B of a greater diameter of the front shell 102 and an oppositely located wall 104C, or more exactly, its outer portion, of the center plate 104, and the second passage 142 communicates with the constant pressure chamber C through a through-opening 104F formed in the outer portion of the wall 104C.

A ring-shaped seal member 144 is interposed between a cylindrical section 104E of a reduced diameter which is disposed radially outward of the through-opening 104F in the center plate 104 and a cylindrical section 102B of a greater diameter of the front shell 102 to maintain a hermetic seal therebetween.

In other respects, the arrangement is similar to that of the first embodiment, and corresponding parts are designated by like reference numerals, to which 100 is added in principle.

With the brake booster of tandem type according to the second embodiment, when the atmosphere is introduced into the internal space A' within the bellows 117, such atmosphere cannot leak toward the constant pressure chamber A from between the front bead 117b and the wall surface of the front shell 102.

THIRD EMBODIMENT

Figure 5:
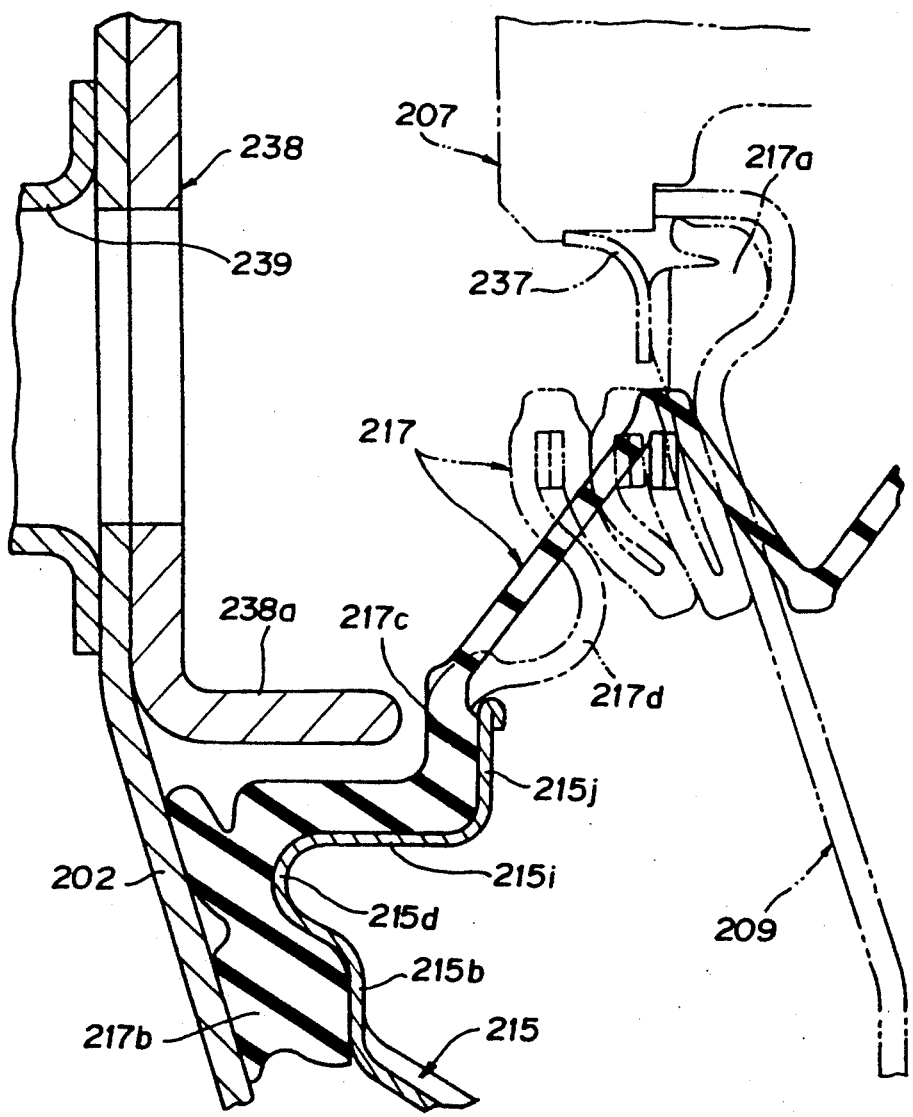
FIG. 5 is a cross section of a further embodiment of the invention.

FIG. 5 shows a third embodiment of the invention, in which a support member 215 represents an improvement of the support 15d formed around the inner periphery of the support member 15 of the first embodiment.

Specifically, the inner periphery of the support member 215 is formed with a U-shaped bulge which projects forwardly, the bulge serving as a support 215d. An inner cylindrical portion 215i which is formed by the support 215d is extended to a point rearward of a cylindrical portion 238a extending around the outer periphery of a reinforcing plate 238, and the rear end of the cylindrical portion 215i is folded back radially inward to define a flat radial portion 215j.

A front bead 217b is supported by the support 215d and its adjacent wall 215b of the support member 215 thus formed, and is urged against the wall surface of a front shell 202. The cylindrical portion 215i and its continuing radial portion 215j are effective to support a portion 217c of an increased wall thickness which is adjacent to the front bead 217b. In other respects, the arrangement is similar to that of the first embodiment, and corresponding parts are designated by like reference numerals, to which 200 is added.

The support member 215 according to the third embodiment is effective to achieve the similar functioning and effect as those attained by the first and the second embodiment. In addition, it provides an additional advantage mentioned below.

Specifically, in the first and the second embodiment, the support member 15 (115) is not provided with the radial portion 215j of the support 215 shown in the third embodiment. Accordingly, when the atmosphere is introduced into the bellows 17 (117) to cause the booster to operate an automatic braking unit, the bellows 17 (117) tends to be expanded under the influence of the atmospheric pressure, and is also decompressed in the axial direction as the valve body 7 (107) is driven forward. When the support member 15 (115) of the first and the second embodiment is employed, because the radial portion 215j of the third embodiment is absent, a thick portion adjacent to the front bead 17a (117a) and its inwardly located thin portion will expand rearwardly, tending to contact the front power piston 9 (109). If such contact occurs even though partly, the forward movement of the front power piston 9 (109) will be impeded, thus disadvantageously causing a reduction in the output from the brake booster.

By contrast, in the third embodiment shown in FIG. 5, the radial portion 215j of the support member 215 avoids such disadvantage. Specifically, as the bellows 217 is decompressed (see phantom lines), if the thick portion 217c adjacent to the front bead 217 tends to bulge rearwardly, such movement is blocked by the radial portion 215j of the support member 215, whereby the inwardly located, thin portion 217d which continues from the thick portion 217c can be suppressed from significantly bulging rearwardly. This enables the thick portion 217c and the thin portion 217d which are adjacent to the front bead 217b to be prevented from contacting the front power piston 209, thus preventing the resulting reduction in the output from the brake booster.

FOURTH EMBODIMENT

Figure 6:
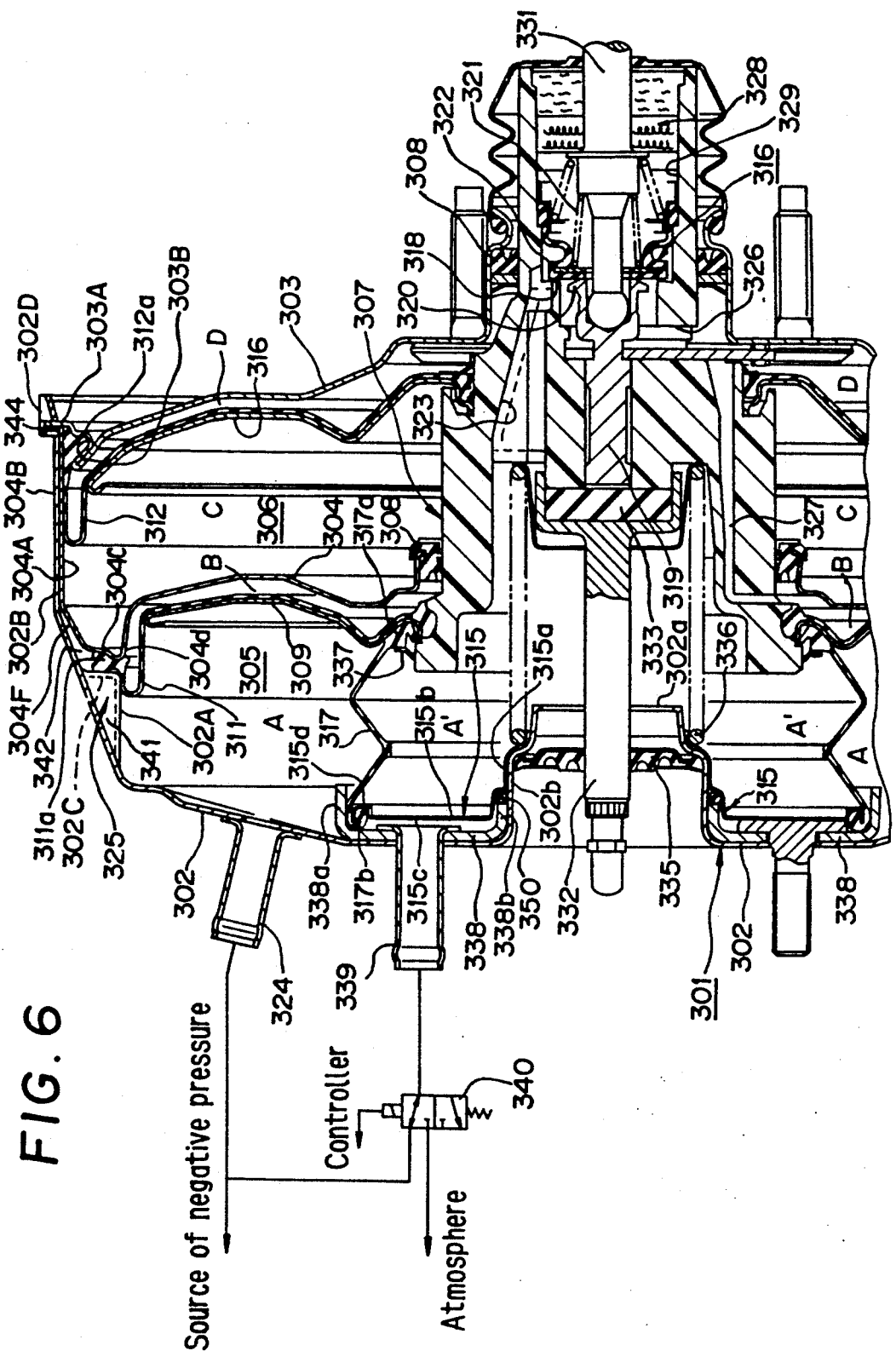
FIG. 6 is a longitudinal section of still another embodiment of the invention.

FIG. 6 shows a fourth embodiment of the invention which is substantially similar to the arrangement of the third embodiment shown in FIG. 4, but in which a support member 315 is disposed inwardly of bellows 317.

Specifically, the support member 315 includes a stepped cylindrical portion 315a which is fitted over an axial cylindrical portion 302b of a front shell 302. The front end of the support member 315 is defined as a radial portion 315b which extends radially outward and which is formed with a forwardly opening annular groove around the outer peripheral edge thereof, the entire annular groove substantially defining a support 315d.

A front bead 317b of bellows 317 is received within the support 315d, and the outer peripheral edge of the latter supports the front bead 317b and its adjacent portion from the inside. The front bead 317b which is supported by the support 315d in this manner fits inside a cylindrical portion 338a formed around the outer periphery of a reinforcing plate 338 and is urged against the end face of the plate 338. At this time, a cylindrical section 302b of the front shell 302 is fitted over the stepped cylindrical portion 315a of the support member 315, and one end of a return spring 336 is disposed in abutment against the stepped cylindrical portion 315a from the rear side.

The radial portion 315b of the support member 315 is formed with a through-opening 315c for allowing a negative pressure or the atmosphere to be introduced into the bellows 317 without any obstruction. An annular seal member 350 is fitted over the cylindrical section 302b of the front shell 302, and is axially held in place by being held between the free end of the cylindrical portion 338b extending around the inner periphery of the reinforcing plate 338 and a step in the stepped cylindrical portion 315a of the support member 315. In this manner, a hermetic seal can more reliably maintained between the cylindrical portion 338b of the reinforcing plate 338 and the stepped cylindrical portion 315a of the support member 315.

In the fourth embodiment the support member 315 is disposed inside the bellows 317, so that a bead 311a extending around the outer periphery of a front diaphragm 311 is directly held between an annular wall 302C of the front shell 302 and an opposite wall 304C of a center plate 304.

Also in the fourth embodiment, a seal member 344 which maintains a hermetic seal between the front shell 302 and the center plate 304 is mounted inside a cylindrical detent 302D, which represents the rear end of the front shell 302, and is held between a step in the cylindrical detent 302D and a flange 303A of a rear shell 303. Also in the fourth embodiment, a push rod 332 projects externally through an opening 302a in the front shell 302. In other respects, the arrangement is substantially similar to that of the third embodiment shown in FIG. 4, and parts corresponding to those used in the third embodiment are designated by like reference numerals, to which 100 is added.

With the arrangement of the fourth embodiment, the occurrence of a leakage around a seal where the front bead 317b is connected can be favorably prevented when introducing the atmosphere into an internal space within the bellows 317.

FIFTH EMBODIMENT

Figure 7:
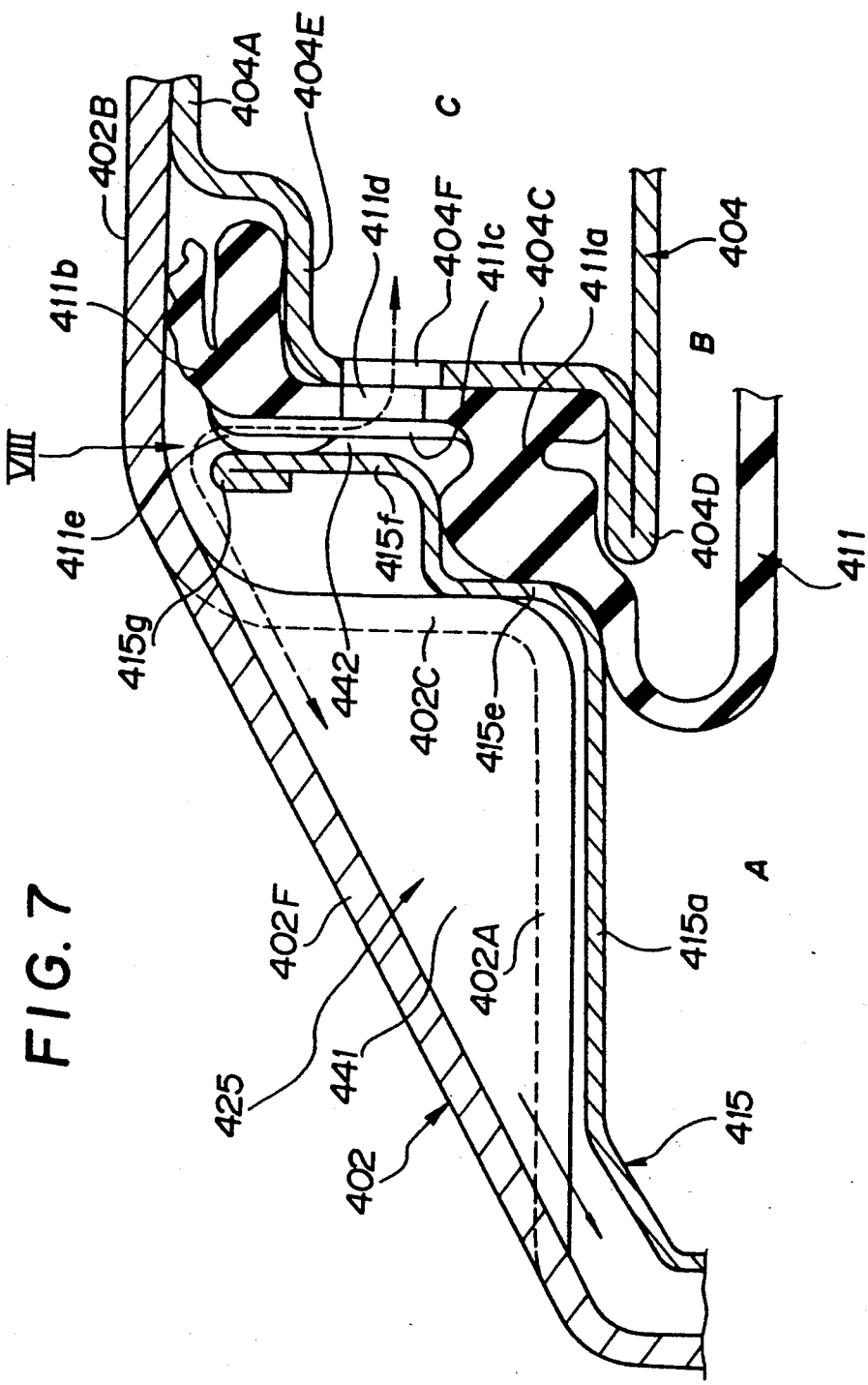
FIG. 7 is a cross section of a still further embodiment of the invention.
Figure 8:
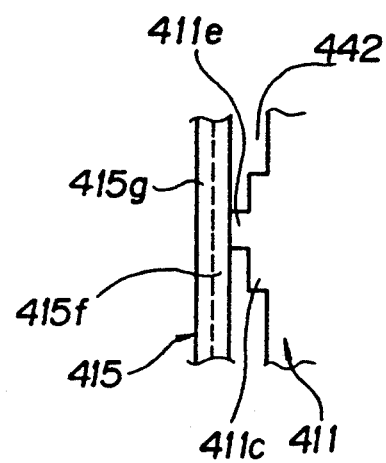
FIG. 8 is a front view of part shown in FIG. 7, as viewed in the direction of an arrow VIII.

FIGS. 7 and 8 show a fifth embodiment of the invention, illustrating an improvement of second passage 42 of the first embodiment shown in FIG. 2 (second constant pressure passage 25). Specifically, in the first embodiment shown in FIG. 2, the locking portion 15g of the support 15 bulges rearwardly of the stop 15f. In the fifth embodiment, a locking portion 415g does not bulge rearwardly but instead a stop 413f extends radially outward with its outer peripheral portion serving as a locking portion 415g.

The end face of each rib 411c of a front diaphragm 411 is formed with an engaging projection 411e which bulges forwardly and against which the locking portion 415g of the support member 411 abuts, thereby preventing a seal 411b around the outer periphery of the front diaphragm 411 from being disengaged toward the front. Under this condition, radial spaces are defined around and adjacent the respective engaging projections 411e and respective ribs 411c, and define a second passage 442 together with an elongate slot 411d in the front diaphragm 411 and a through-opening 404F in a center plate 404.

In other respects, the arrangement is similar to that of the first embodiment shown in FIG. 2, and corresponding parts are designated by like numerals as used therein to which 400 is added.

While the invention has been disclosed above in connection with several embodiments thereof, it should be understood that a number of changes, modifications and substitutions therein will readily occur to one skilled in the art from the above disclosure without departing from the spirit and scope of the invention defined by the appended claims.

What is claimed is:

1. A brake booster including a valve body slidably disposed in a shell having front and rear walls, a power piston connected to the valve body, a diaphragm disposed on a back side of the power piston and having an outer peripheral bead section clamped between the front and read walls of the shell, a constant and variable pressure chamber disposed across the power piston, a pressure passage formed in the valve body for providing communication between the constant pressure chamber and a valve mechanism which switches a fluid circuit and for providing communication between the constant and the variable pressure chamber through the valve mechanism and a passage between said valve mechanism and said variable pressure chamber, said bellows disposed within the constant pressure chamber and having a rear end communicated to the pressure passage and having a front end sealed to the shell, thereby allowing a negative pressure or an atmosphere to be selectively supplied into an internal space within the bellows;

characterized by a support member disposed within the constant pressure chamber and having an outer peripheral portion clamped between the front wall of the shell and the outer peripheral beard section of the diaphragm and having an inner peripheral portion extending from said outer peripheral portion, said support member supporting a front end of the bellows from an outer side of the said bellows and urging the front end of the bellows against the shell.

2. A brake booster according to claim 1 in which the support member comprises a support for supporting a front end of the bellows and for urging it against the shell, and a radial portion which extends radially inward continuing from the support, the radial portion being effective to prevent an inner portion of the bellows which continues from its end from bulging rearwardly.

3. A brake booster according to claim 1 in which a center plate divides the interior of the shell into a front an rear chamber, each of which is in turn divided into a constant and a variable pressure chamber, the constant pressure chamber recited in claim 1 being the constant pressure chamber in the front chamber.

4. A brake booster according to claim 3 in which a front diaphragm is applied to the back surface of a front power piston which is disposed within the front chamber thus dividing the front chamber into the constant and the variable pressure chamber, the front diaphragm having a bead extending around the outer periphery thereof which is axially held between a front wall of the shell and an oppositely located wall of the center plate, the wall of the center plate being internally formed with an annular projection which extends forwardly and which is effective to prevent the bead of the front diaphragm from being disengaged radially inward.

5. A brake booster according to claim 4, further including a second constant pressure passage disposed within the shell and at a location outward of the bead extending around the outer periphery of the front diaphragm for providing a direct communication between the constant pressure chamber of the front chamber and the constant pressure chamber of the rear chamber.

6. A brake booster according to claim 5, further including a tubing mounted on the outside of the shell for communicating the internal space within the bellows with a source of negative pressure, a switching valve disposed in a conduit between the tubing and the source of negative pressure for causing the internal space within the bellows to selectively communicate with the source of negative pressure or the atmosphere.

7. A brake booster including a valve body slidably disposed in a shell having front and rear walls, a power piston connected to the valve body, a diaphragm disposed on a back side of the power piston to divide the interior of the shell into a constant pressure chamber and variable pressure chamber, a pressure passage formed in the valve body for providing communication between the constant pressure chamber and a valve mechanism which switches a fluid circuit and for providing communication between the constant and the variable pressure chamber through the valve mechanism and a passage between said valve mechanism and said variable pressure chamber, said bellows disposed within the constant pressure chamber and having a rear end communicated to the pressure passage and having a front end sealed to the shell, thereby allowing a negative pressure or an atmosphere to be selectively supplied into an internal space within the bellows;

characterized by said diaphragm having an outer peripheral bead section clamped between the front and rear walls of the shell, said rear wall of said shell being internally formed with an annular projection which extends forwardly and which is effective to prevent said bead section from being disengaged radially inward, and a support member disposed within the constant pressure chamber for supporting the front end of said bellows and urging said front end against said shell, said support member having a rear end formed with a flange-like positioning portion which extends radially outward and which is interposed between said front wall and said bead section, said support member being formed with a stop at a location radially outward of said positioning portion, said stop being effective to limit movement of said support member as it is displaced axially rearward.

8. A brake booster according to claim 7, further including a tubing mounted on the outside of the shell to allow the internal space within the bellows to communicate with a source of negative pressure, a switching valve disposed in a conduit between the tubing and the source of negative pressure for selectively causing the internal space within the bellows to communicate with the source of negative pressure or the atmosphere.

9. A brake booster including a valve body slidably disposed in a shell having front and rear walls, a center plate disposed in said shell to divide the interior thereof into a front and rear chamber, a front power piston connected to the valve body in the front chamber, a front diaphragm disposed on a back side of the front power piston to divide the front chamber into a constant pressure chamber and variable pressure chamber, said front diaphragm having an outer peripheral bead section clamped axially between the front wall of said shell and an oppositely disposed wall of said center plate, the wall of said center plate being internally formed with an annular projection which extends forwardly and which is effective to prevent said bead section from being disengaged radially inward, a pressure passage formed in the valve body for providing communication between the constant pressure chamber and a valve mechanism which switches a fluid circuit and for providing communication between the constant and variable pressure chamber through the valve mechanism and a passage between said valve mechanism and said variable pressure chamber, bellows disposed within the constant pressure chamber and having a rear end communicated to the pressure passage and having a front end sealed to the shell, thereby allowing a negative pressure or an atmosphere to be selectively supplied into an internal space within the bellows; and a support member disposed within the constant pressure chamber for supporting the front end of said bellows and urging said front end against said shell, said support member having a rear end formed with a flange-like positioning portion which extends radially outward and which is interposed between said front wall and said bead section, said support member being formed with a stop at a location radially outward of said positioning portion, said stop being effective to limit movement of said support member as it is displaced axially rearward.

10. A brake booster according to claim 9, further including a second constant pressure passage disposed within the shell at a location outward of the bead extending around the outer periphery of the front diaphragm for providing a communication between the constant pressure chambers of the front and the rear chamber.

11. A brake booster according to claim 10 in which the bead extending around the outer periphery of the front diaphragm is extended radially outward to define a seal around its periphery which is effective to maintain a hermetic seal between the shell and the center plate, the wall of the shell being partly formed with a bulge which extends forwardly to define an internal space therein, the internal space cooperating with a through-opening provided between the bead and the seal disposed around the outer periphery and with a through-opening formed in the center plate to define the second constant pressure passage.

12. A brake booster according to claim 11, further including a tubing mounted on the outside of the shell for communicating the internal space within the bellows with the source of negative pressure, a switching valve disposed in a conduit between the tubing and the source of negative pressure for causing the internal space with the bellows to communicate selective with the source of negative pressure or the atmosphere.

13. A brake booster including a valve body slidably disposed in a shell having front and rear walls, a center plate disposed in said shell to divide the interior thereof into a front and rear chamber sections, a front and rear power piston connected to the valve body in the respective front and rear chamber sections, a front and rear diaphragm disposed on a back side of the respective front and rear power piston to divide the respective front and rear chamber sections each into a constant pressure chamber and variable pressure chamber, said front diaphragm having an outer peripheral seal section disposed between the front wall of said shell and said center plate and having a radially inward bead section clamped axially between the front wall of said shell and an oppositely disposed wall of said center plate to maintain a hermetic seal therebetween, said wall of said center plate being internally formed with an annular projection which extends forwardly and which is effective to prevent said bead section from being disengaged radially inward, a first constant pressure passage formed in the valve body for providing communication between the constant pressure chamber of said front chamber section and a valve mechanism which switches a fluid circuit and for providing communication between the constant and variable pressure chamber of said front chamber section through the valve mechanism and a passage between said valve mechanism and the variable pressure chamber of said front chamber section, a second constant pressure passage disposed with the shell at a location outward of said bead section of said front diaphragm for providing communication between the constant pressure chambers of said front and rear chamber sections, bellows disposed within the constant pressure chamber of said front chamber section and having a rear end communicated to the first constant pressure passage and having a front end sealed to the shell, thereby allowing a negative pressure or an atmosphere to be selectively supplied into an internal space within the bellows; and a support member disposed within the constant pressure chamber of said front chamber section for supporting the front end of said bellows and urging said front end against said shell, said support member having a rear end formed with a flange-like positioning portion which extends radially outward and which is interposed between said front wall and said bead section, said support member being formed with a stop at a location radially outward of said positioning portion, said stop being effective to limit movement of said support member as it is displaced axially rearward, said support member having a locking portion at a location outwardly of said stop, said locking portion being disposed in abutment against the front side of said outer peripheral seal section of said front diaphragm to prevent its disengagement.

14. A brake booster according to claim 13 in which the outer peripheral seal is formed with a plurality of radially extending ribs at locations opposite to the positioning portion and the locking portion of the support member, each of the ribs being formed with an engaging projection which bulges forwardly and against which the locking portion of the support member is disposed in abutment, the second constant pressure passage comprising a space defined within a forwardly bulging portion of a shell wall, a radial space defined adjacent to the respective ribs and engaging projections of the front diaphragm, a through-opening formed between the bead around the outer periphery and the outer peripheral seal, and a through-opening formed to extend through the wall of the center plate.

* * * * *

UNITED STATES PATENT AND TRADEMARK OFFICE
CERTIFICATE OF CORRECTION

PATENT NO. : 5 235 897
DATED : August 17, 1993
INVENTOR(S) : Makoto WATANABE

It is certified that error appears in the above-identified patent and that said Letters Patent is hereby corrected as shown below:

Column 13, line 28; change "read" to ---rear---.
line 36; change "said" to ---and---.
line 46; change "beard" to ---bead---.
line 50; delete "the".
line 63; change "an" to ---and a---.
Column 14, lines 1 and 2; change "cham-ber thus" to ---chamber, thus---.
line 36; delete "the".
Column 15, line 64; change "selective" to ---selectively---.
Column 16; change "with" to ---within---.

Signed and Sealed this

Fifteenth Day of March, 1994

Attest:

BRUCE LEHMAN

Attesting Officer

Commissioner of Patents and Trademarks